(No Model.)
W. A. MILES.
JOINT FOR METAL TUBES.
No. 325,556. Patented Sept. 1, 1885.
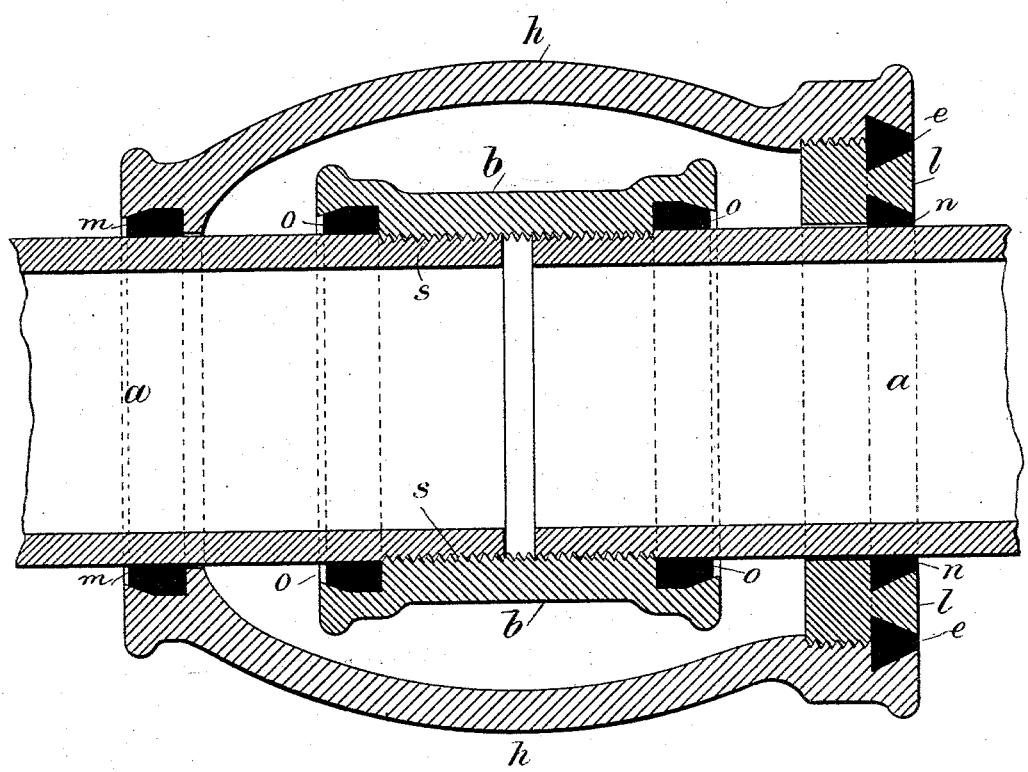
Witnesses
Chas H Smith
J. Staub
Inventor
William A. Miles
Per Lemuel W. Serrell
att

UNITED STATES PATENT OFFICE.

WILLIAM A. MILES, OF COPAKE IRON WORKS, NEW YORK.

JOINT FOR METAL TUBES.

SPECIFICATION forming part of Letters Patent No. 325,556, dated September 1, 1885.

Application filed February 16, 1885. (No model.)

*To all whom it may concern:*

Be it known that I, WILLIAM A. MILES, of Copake Iron Works, in the county of Columbia and State of New York, have invented an Improvement in Joints for Metal Tubes, of which the following is a specification.

This joint is especially intended for gas-pipes where the escape of gas is both dangerous and detrimental to health, and it is an improvement upon that for which Latters Patent No. 272,574 were granted to me February 20, 1883.

In the drawing, $a\ a$ represent portions of the two lengths of pipe to be united. $b$ is the socket or sleeve, made with screw-threads at $s$ for the ends of the pipe to be screwed into, and with recesses at the ends of the socket generally corresponding to the aforesaid patent; but instead of casting the lead or other soft-metal packing into the recesses and around the screw-threaded portions of such tubes $a$, I apply the soft-metal rings $o\ o$ around the plain portions of the pipes $a\ a$, and they are preferably cast separately and slipped over the pipes $a\ a$ and into the recesses in the sockets provided for them, and these soft-metal rings are calked to pack them tightly around the plain portions of the tubes $a$, and adjacent to the screw-threaded portions of such tubes, thus lessening the labor and increasing the facility for making the joint.

In my aforesaid patent the soft metal passed into portions of the screw-threads. In my present improvements the soft metal is held within the recess in the coupling, in consequence of the recess being narrowest at its outer end; hence any pressure upon the inner end of the soft-metal packing cannot blow such packing out, but will tighten it into the recess, and the soft metal is held in place independently of the screw-thread or other means for permanently locking the iron pipe and the coupling together.

In consequence of the strain upon the lengths of pipe employed in gas-mains especially due to changes of temperature, tending to cause the joint to leak, I make use of the safety-sleeve $h$, that is hollow and surrounds the joint between the tubes $a\ a$. This safety-sleeve is intended to receive any leakage of gas, and it may be conveyed away to the atmosphere or taken off in any convenient manner. This safety-sleeve is of the proper size to receive within it the joint between the pipes. This sleeve, however, is slipped upon one pipe $a$ and the joint-ring $l$ upon the other, and after the inner joint has been made the parts are brought together and the ring $l$ is entered within the largest end of the safety-sleeve and screwed or otherwise secured therein, and then soft metal is cast into the recesses $e\ n\ m$ and calked, or else rings previously cast to fit into these recesses and threaded upon the pipes are entered into these recesses and calked to make tight joints. By this improvement the joint is made very secure, and should there be any leakage at the inner joint, the gas is received into the safety-sleeve and may be conveyed away to any suitable place where it will not be injurious.

I do not claim a coupling into which the pipes are screwed, nor a coupling having recesses into which solder is allowed to run, the surfaces being tinned. Neither do I claim pipes with interlocking projections and couplings having recesses for the projections and recesses for soft-metal packing, as these have been used and are not well adapted to the circumstances where my couplings are available, such as with natural gas under high pressure.

I claim as my invention—

1. The combination, with the pipes $a$, of a coupling into which the pipes are screwed, and in which coupling there are recesses around the pipes and within the end portions, and separate soft-metal rings slipped into the recesses and calked to make tight joints, substantially as set forth.

2. The combination, with the pipes $a$ and coupling, of the safety-sleeve surrounding the coupling, the ring $l$, and the packing, substantially as set forth.

3. The combination, with the pipes $a$, of a coupling into which the pipes are screwed, said coupling having recesses at its ends around the plain portions of the pipes, and soft metal within the recesses calked around the said plain portions, substantially as set forth.

4. The coupling $b$, having internal recesses that are narrowest near the ends of the coupling, in combination with the pipes $aa$, screwed into such coupling, and the soft-metal packing introduced into such recesses and calked, said packing being held around the plain portion of the pipe by the coupling, substantially as set forth.

5. In combination with the pipes $a\ a$ and a screw-coupling to connect such pipes together, a case surrounding the coupling, and a packing of lead or similar material within the coupling and around the pipe, substantially as specified.

Signed by me this 9th day of February, A. D. 1885.

WILLIAM A. MILES.

Witnesses:
GEO. T. PINCKNEY,
WILLIAM G. MOTT.